United States Patent
Ito et al.

(10) Patent No.: US 11,621,431 B2
(45) Date of Patent: Apr. 4, 2023

(54) FUEL CELL SYSTEM

(71) Applicant: TOYOTA JIDOSHA KABUSHIKI KAISHA, Toyota (JP)

(72) Inventors: Masahiro Ito, Toyota (JP); Masashi Toida, Nagoya (JP); Hiroyuki Tsunekawa, Seto (JP); Tsuyoshi Maruo, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 7 days.

(21) Appl. No.: 17/076,753

(22) Filed: Oct. 21, 2020

(65) Prior Publication Data
US 2021/0210777 A1     Jul. 8, 2021

(30) Foreign Application Priority Data
Jan. 8, 2020    (JP) ............................. JP2020-001351

(51) Int. Cl.
   *H01M 8/04746*     (2016.01)
   *H01M 8/04082*     (2016.01)
   (Continued)

(52) U.S. Cl.
   CPC ... *H01M 8/04753* (2013.01); *H01M 8/04201* (2013.01); *H01M 8/04231* (2013.01); (Continued)

(58) Field of Classification Search
   CPC ......... H01M 8/04753; H01M 8/04201; H01M 8/04231; H01M 8/04253; H01M 8/04701; (Continued)

(56) References Cited

U.S. PATENT DOCUMENTS

2006/0180235 A1* 8/2006 Kubo .............. H01M 8/04201
                                                            141/82
2009/0038867 A1* 2/2009 Jufuku .................. B60L 58/33
                                                            429/437
(Continued)

FOREIGN PATENT DOCUMENTS

JP    2009138384 A    6/2009
JP    2017134993 A    8/2017

OTHER PUBLICATIONS

Migliardini et al., Hydrogen purge and reactant feeding strategies in self-humidified PEM fuel cell systems, International Journal of Hydrogen Energy, Elsevier, 42 (2017), 1758-1765. (Year: 2017).*

*Primary Examiner* — Christian Roldan
(74) *Attorney, Agent, or Firm* — Hunton Andrews Kurth LLP (57) ABSTRACT

A fuel cell system includes a fuel cell, a hydrogen tank, a hydrogen supply passage connecting the hydrogen tank and the fuel cell, a cutoff valve configured to cut off circulation of hydrogen in the hydrogen supply passage, a detection unit configured to detect a start of filling of the hydrogen tank with hydrogen, and a purge controller configured to close the cutoff valve in a case where the fuel cell system is stopped and the detection unit detects the start of filling with hydrogen in a state in which purge processing of purging the in-cell hydrogen flow passage is to be executed, and to execute processing of purging the in-cell hydrogen flow passage by causing hydrogen remaining on a downstream side of the cutoff valve in a hydrogen flow in the hydrogen supply passage to flow in the in-cell hydrogen flow passage as the purge processing.

7 Claims, 6 Drawing Sheets

(51) Int. Cl.
  *H01M 8/04223*    (2016.01)
  *H01M 8/04089*    (2016.01)
  *H01M 8/04119*    (2016.01)
  *H01M 8/04701*    (2016.01)

(52) U.S. Cl.
  CPC ... *H01M 8/04253* (2013.01); *H01M 8/04701* (2013.01); *H01M 2250/20* (2013.01)

(58) Field of Classification Search
  CPC ......... H01M 2250/20; H01M 8/04097; H01M 8/04179; H01M 8/04225; H01M 8/04302; Y02T 90/40; Y02E 60/50
  USPC ....................................................... 429/429
  See application file for complete search history.

(56) References Cited

U.S. PATENT DOCUMENTS

| | | | | |
|---|---|---|---|---|
| 2010/0081016 A1* | 4/2010 | Sugiura | ................. | H01M 8/241 |
| | | | | 429/429 |
| 2010/0203409 A1* | 8/2010 | Manabe | ............ | H01M 8/04037 |
| | | | | 429/432 |
| 2013/0040219 A1* | 2/2013 | Naganuma | ........ | H01M 8/04731 |
| | | | | 429/429 |
| 2016/0141672 A1* | 5/2016 | Toida | ................ | H01M 8/04097 |
| | | | | 429/444 |
| 2017/0331129 A1* | 11/2017 | Asai | ................. | H01M 8/04388 |

\* cited by examiner

FUEL CELL SYSTEM

INCORPORATION BY REFERENCE

The disclosure of Japanese Patent Application No. 2020-001351 filed on Jan. 8, 2020 including the specification, drawings and abstract is incorporated herein by reference in its entirety.

BACKGROUND

1. Technical Field

The present disclosure relates to a fuel cell system and a control method of a fuel cell system.

2. Description of Related Art

In a fuel cell system equipped in a fuel cell vehicle, generally, when the system is stopped, purge processing of supplying a purge gas to the fuel cell is executed to reduce an amount of water in the fuel cell to ensure the startability of the system in a low temperature environment. For such a fuel cell system, a technique relating to the adjustment of the timing of starting the purge processing and the timing of starting filling of a hydrogen tank with hydrogen included in the fuel cell system has been proposed (for example, see Japanese Unexamined Patent Application Publication No. 2017-134993 (JP 2017-134993 A)).

SUMMARY

However, in the related art, sufficient consideration has not been given to the prevention of freezing of the fuel cell during filling with hydrogen. For example, the present inventors have found a new problem in which in a case where the purge processing is executed in parallel with filling with hydrogen, freezing occurs in a hydrogen flow passage or the fuel cell due to hydrogen to be supplied to the fuel cell system for filling the hydrogen tank flowing in the hydrogen flow passage that connects the hydrogen tank and the fuel cell.

The present disclosure can be implemented as the following modes.

(1) A first aspect of the present disclosure provides a fuel cell system. A first aspect of the disclosure relates to a fuel cell system including a fuel cell, a hydrogen tank, a hydrogen supply passage, a cutoff valve, a detection unit, and a purge controller. The fuel cell has an in-cell hydrogen flow passage through which hydrogen flows. The hydrogen tank is configured to store hydrogen. The hydrogen supply passage connects the hydrogen tank and the fuel cell. The cutoff valve is configured to cut off circulation of hydrogen in the hydrogen supply passage. The detection unit is configured to detect a start of filling of the hydrogen tank with hydrogen. The purge controller is configured to close the cutoff valve in a case where the fuel cell system is stopped and the detection unit detects the start of filling with hydrogen in a state in which purge processing of purging the in-cell hydrogen flow passage is to be executed, and to execute processing of purging the in-cell hydrogen flow passage by causing hydrogen remaining on a downstream side of the cutoff valve in a hydrogen flow in the hydrogen supply passage to flow in the in-cell hydrogen flow passage as the purge processing.

In the fuel cell system according to the first aspect, since the in-cell hydrogen flow passage is purged by closing the cutoff valve and causing hydrogen remaining on the downstream of the cutoff valve in the hydrogen supply passage to flow in the in-cell hydrogen flow passage, the purge processing can be executed in parallel with filling with hydrogen. As a result, in a case where filling with hydrogen is executed in the low-temperature environment, the fuel cell can be suppressed from freezing, and the fuel cell or a flow passage of a fuel gas can be suppressed from freezing due to low-temperature hydrogen used for filling flowing in the fuel cell.

(2) The fuel cell system according to the first aspect may further include a circulation flow passage including the in-cell hydrogen flow passage and a part of the hydrogen supply passage, and being a flow passage through which hydrogen circulates, a circulation device configured to allow hydrogen to circulate through the circulation flow passage, and a discharge valve configured to discharge hydrogen from the circulation flow passage. In the fuel cell system according to the first aspect, the purge processing executed by the purge controller may include an operation of allowing hydrogen to circulate through the circulation flow passage by the circulation device, and an operation of opening the discharge valve. In the fuel cell system according to the first aspect, the purge processing can be executed by circulating hydrogen remaining in the circulation flow passage through the circulation flow passage.

(3) The fuel cell system according to the first aspect may further include a control valve provided between the cutoff valve and the fuel cell and configured to control an amount of hydrogen supplied to the fuel cell. In the fuel cell system according to the first aspect, the purge processing executed by the purge controller may include an operation of driving the control valve to supply hydrogen remaining between the control valve and the cutoff valve in the hydrogen supply passage to the in-cell hydrogen flow passage. In the fuel cell system according to the first aspect, since the purge processing can be executed by using hydrogen remaining between the control valve and the cutoff valve in the hydrogen supply passage, the efficiency of the purge processing can be improved.

(4) The fuel cell system according to the first aspect may further include a low-temperature determination unit configured to determine whether an environment temperature of the fuel cell system is a low-temperature environment temperature carrying a risk of freezing of the fuel cell upon a next startup of the fuel cell system. In the fuel cell system according to the first aspect, the purge controller may be configured to determine that the state in which the purge processing is to be executed is in effect in a case where the low-temperature determination unit determines that the environment temperature is the low-temperature environment temperature. In the fuel cell system according to the first aspect, in a case where filling with hydrogen is executed in the low-temperature environment, the purge processing can be appropriately executed in parallel with filling with hydrogen.

(5) The fuel cell system according to the first aspect may further include an oxidizing gas supply unit configured to supply an oxidizing gas to an in-cell oxidizing gas flow passage through which an oxidizing gas containing oxygen flows in the fuel cell. In the fuel cell system according to the first aspect, the purge processing executed by the purge controller may include an operation of driving the oxidizing gas supply unit and causing an oxidizing gas to flow in the in-cell oxidizing gas flow passage to purge the in-cell oxidizing gas flow passage. In the fuel cell system according to the first aspect, since the purge of the in-cell hydrogen flow passage and the purge of the in-cell oxidizing gas flow passage can be executed in parallel, the efficiency of the purge processing can be improved.

(6) The fuel cell system according to the first aspect may further include a refrigerant flow passage through which a refrigerant cooling the fuel cell flows, a branch flow passage, a temperature sensor, a refrigerant pump, and a temperature retention controller. The branch flow passage branching from the refrigerant flow passage and guiding the refrigerant such that heat is exchangeable between the refrigerant and a component provided in a reaction gas flow passage through which hydrogen or an oxidizing gas to be supplied to the fuel cell flows. The temperature sensor is configured to detect a temperature of the fuel cell. The refrigerant pump is configured to cause the refrigerant in the fuel cell to flow in the branch flow passage. The temperature retention controller is configured to drive the refrigerant pump in a case where the fuel cell system is stopped, and the temperature of the fuel cell detected by the temperature sensor exceeds a predetermined reference temperature. In the fuel cell system according to the first aspect, since the temperature of the component provided in the reaction gas flow passage through which hydrogen or an oxidizing gas to be supplied to the fuel cell flows can be raised or held by the refrigerant, freezing of the component can be suppressed.

The present disclosure can be implemented in various forms other than the above, for example, can be implemented by forms of a fuel cell vehicle equipped with a fuel cell system, a moving object equipped with a fuel cell system, a purge method of a fuel cell, a control method of a fuel cell system, a computer program realizing the control method, and a non-transitory recording medium recording the computer program.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
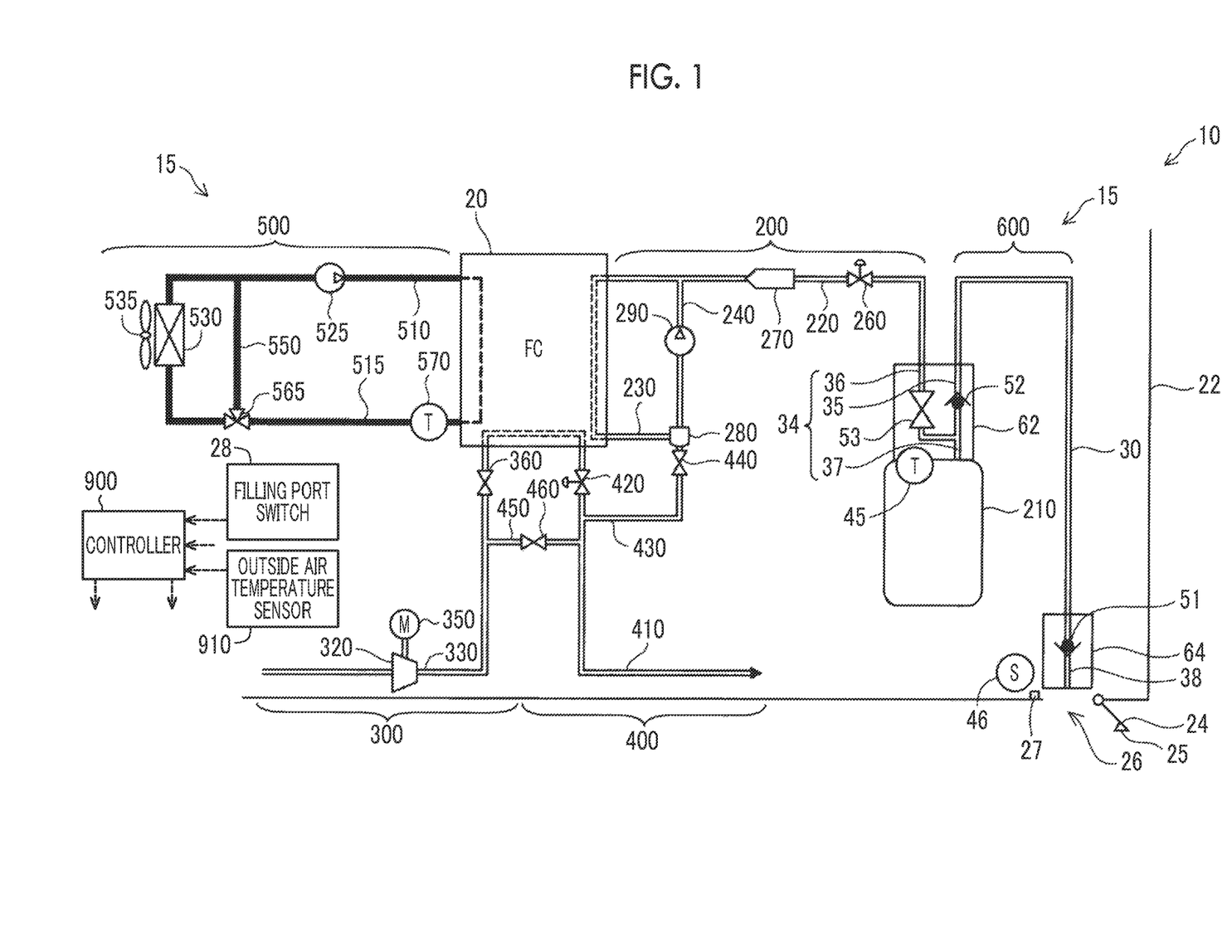
FIG. 1 is an explanatory diagram schematically showing an outline configuration of a fuel cell system.

A. First Embodiment (A-1) Overall Configuration of Fuel Cell System:

FIG. 1 is an explanatory diagram schematically showing an outline configuration of a fuel cell system 15 as a first embodiment of the present disclosure. The fuel cell system 15 according to the present embodiment is equipped in a fuel cell vehicle 10 as a driving power source. However, the fuel cell system 15 may be used as a driving power source of a moving object other than the vehicle. The fuel cell system 15 includes a fuel cell 20, a fuel gas supply system 200, an oxidizing gas supply system 300, an exhaust gas system 400, a cooling system 500, a hydrogen filling system 600, and a controller 900.

The fuel cell 20 is a device that generates drive energy for the fuel cell vehicle 10. The fuel cell 20 has a stack structure in which a plurality of single cells is stacked, and receives the supply of a fuel gas containing hydrogen and an oxidizing gas containing oxygen to generate power. The fuel cell 20 according to the present embodiment is a polymer electrolyte fuel cell. In each of single cells configuring the fuel cell 20, a flow passage through which a fuel gas flows is formed on an anode side with an electrolyte film interposed therebetween and a flow passage through which an oxidizing gas flows is formed on a cathode side. The flow passage through which a fuel gas flows in the fuel cell 20 is also referred to as an "in-cell hydrogen flow passage". The flow passage through which an oxidizing gas flows in the fuel cell 20 is also referred to as an "in-cell oxidizing gas flow passage". Furthermore, a flow passage through which a refrigerant cooling the fuel cell 20 flows is formed in the fuel cell 20. The fuel cell 20 is not limited to the polymer electrolyte fuel cell, and other types of fuel cells such as a solid oxide fuel cell may be adopted.

The fuel gas supply system 200 includes a hydrogen tank 210, a fuel gas supply pipe 220, a fuel gas exhaust pipe 230, a fuel gas reflux pipe 240, a regulator 260, an injector 270, a gas-liquid separator 280, and a hydrogen pump 290. The hydrogen tank 210 is a storage device that stores a hydrogen gas as a fuel gas, and is connected to the fuel cell 20 via the fuel gas supply pipe 220. The configuration of the hydrogen tank 210 will be described in more detail below. In the fuel gas supply system 200, a hydrogen gas stored in the hydrogen tank 210 is supplied to the flow passage on the anode side of the fuel cell 20 from the injector 270 after being decompressed by the regulator 260. The injector 270 includes a solenoid valve inside, and the amount of hydrogen supplied from the hydrogen tank 210 is controlled by opening and closing the solenoid valve. Although a single injector is shown as the injector 270 in FIG. 1, a plurality of injectors may be provided. Further, the injector 270 need only control the amount of hydrogen flowing through the fuel gas supply pipe 220, and cut off the circulation of fuel gas in the purge processing during filling to be described below, and may be configured by a flow rate control valve capable of controlling the flow rate of hydrogen flowing in the downstream side to an any flow rate. When the fuel gas is supplied from the hydrogen tank 210 to the fuel cell 20, in the fuel gas supply pipe 220, the pressure is highest from the hydrogen tank 210 to the regulator 260, and the pressure decreases from the regulator 260 to the injector 270, and from the injector 270 to the fuel cell 20, in this order.

The fuel gas exhaust pipe 230 is a flow passage through which an anode off-gas discharged from the fuel cell 20 flows. The fuel gas reflux pipe 240 is connected to the fuel gas exhaust pipe 230, and a portion downstream of the injector 270 in the fuel gas supply pipe 220. The anode off-gas discharged from the fuel cell 20 to the fuel gas exhaust pipe 230 is guided to the fuel gas supply pipe 220 again via the fuel gas reflux pipe 240. Therefore, in the fuel cell system 15, the fuel gas circulates the fuel gas exhaust pipe 230, the fuel gas reflux pipe 240, a part of the fuel gas supply pipe 220, and the in-cell hydrogen flow passage formed in the fuel cell 20 while hydrogen in the fuel gas is consumed by power generation. The fuel gas exhaust pipe 230, the fuel gas reflux pipe 240, a part of the fuel gas supply pipe 220, and the in-cell hydrogen flow passage are collectively referred to as a "circulation flow passage". The fuel gas reflux pipe 240 is provided with the above-described hydrogen pump 290 that pressurizes the fuel gas to circulate the fuel gas. The hydrogen pump 290 is also called a "circulation device". The circulation device that circulates hydrogen through the circulation flow passage may be configured by using a mechanical driving force such as a pump, or may be configured differently, for example, by using an ejector for sucking a low pressure fluid by using the force of a high pressure fluid.

The gas-liquid separator 280 is provided in the connecting portion between the fuel gas exhaust pipe 230 and the fuel gas reflux pipe 240. The anode off-gas contains impurities such as nitrogen or water vapor as well as hydrogen not consumed by power generation. The gas-liquid separator 280 separates water in the anode off-gas from the gas (hydrogen or nitrogen). In the present embodiment, impurities are removed from the fuel gas circulating in the flow passage via the gas-liquid separator 280.

The oxidizing gas supply system 300 includes an air compressor 320, an oxidizing gas supply pipe 330, and a sealing valve 360. The fuel cell 20 according to the present embodiment uses air as the oxidizing gas. The air compressor 320 is driven by an air compressor motor 350 to compress air, and supplies air to the flow passage on the cathode side of the fuel cell 20 via the oxidizing gas supply pipe 330. The air compressor 320 is also referred to as an "oxidizing gas supply unit". The sealing valve 360 is provided in the oxidizing gas supply pipe 330 in the vicinity of the connecting portion with the fuel cell 20, and is opened when the oxidizing gas is supplied to the fuel cell 20.

The exhaust gas system 400 includes an exhaust gas pipe 410, a back pressure valve 420, a fuel gas discharge pipe 430, a purge valve 440, an oxidizing gas bypass pipe 450, and a bypass valve 460. The exhaust gas pipe 410 is a flow passage through which the cathode off-gas is discharged from the fuel cell 20. The exhaust gas pipe 410 is provided with the back pressure valve 420. The pressure (back pressure) of the oxidizing gas in the in-cell oxidizing gas flow passage can be controlled by controlling the opening degree of the back pressure valve 420. The fuel gas discharge pipe 430 connects the gas-liquid separator 280 and the exhaust gas pipe 410. The fuel gas discharge pipe 430 is provided with the purge valve 440. The purge valve 440 is temporarily opened, and water and gas are discharged from the gas-liquid separator 280, therefore, the concentration of impurities in the fuel gas circulating through the circulation flow passage is reduced. The purge valve 440 is also referred to as a "discharge valve".

The oxidizing gas bypass pipe 450 connects the oxidizing gas supply pipe 330 and the exhaust gas pipe 410. The oxidizing gas bypass pipe 450 is connected to the exhaust gas pipe 410 at a downstream side of a portion, provided with the back pressure valve 420, of the exhaust gas pipe 410. The bypass valve 460 is provided in the oxidizing gas bypass pipe 450. By opening the bypass valve 460, at least a part of air discharged by the air compressor 320 can flow in the exhaust gas pipe 410 via the oxidizing gas bypass pipe 450 without passing through the fuel cell 20. The fuel gas discharge pipe 430 is connected to the exhaust gas pipe 410 at a portion downstream of the back pressure valve 420 in the exhaust gas pipe 410 and upstream of the connecting portion with the oxidizing gas bypass pipe 450. The anode off-gas flowing from the fuel gas discharge pipe 430 in the exhaust gas pipe 410 is diluted with at least one of the cathode off-gas discharged from the fuel cell 20 or the oxidizing gas passing through the oxidizing gas bypass pipe 450, and then is discharged to the atmosphere.

The cooling system 500 includes a refrigerant supply pipe 510, a refrigerant discharge pipe 515, a refrigerant bypass pipe 550, a first refrigerant pump 525, a radiator 530, and a switching valve 565. The refrigerant supply pipe 510, the refrigerant discharge pipe 515, the refrigerant bypass pipe 550, and the flow passage of the refrigerant in the fuel cell 20 are collectively referred to as a "refrigerant flow passage". The refrigerant supply pipe 510 is a pipe for supplying a refrigerant to the fuel cell 20, and the refrigerant supply pipe 510 is provided with the first refrigerant pump 525. The refrigerant discharge pipe 515 is a pipe for discharging the refrigerant from the fuel cell 20. The radiator 530 for cooling the refrigerant is provided between a downstream portion of the refrigerant discharge pipe 515 and an upstream portion of the refrigerant supply pipe 510. The radiator 530 is provided with a radiator fan 535. The radiator fan 535 blows air to the radiator 530 and promotes heat radiation from the radiator 530. The first refrigerant pump 525 controls the flow rate of the refrigerant circulating through the refrigerant supply pipe 510, the refrigerant discharge pipe 515, and the flow passage inside the fuel cell 20. In the refrigerant discharge pipe 515, an FC temperature sensor 570 that detects the temperature of the refrigerant discharged from the fuel cell 20 is provided in the vicinity of the connecting portion with the fuel cell 20. In the fuel cell system 15 according to the present embodiment, the temperature of the refrigerant detected by the FC temperature sensor 570 is used as the temperature of the fuel cell 20. The FC temperature sensor 570 is also simply referred to as a "temperature sensor". The temperature sensor need only be able to detect the temperature of the fuel cell 20, and may be a sensor that detects the temperature of the refrigerant discharged from the fuel cell 20, or may be a temperature sensor that directly detects the temperature of the fuel cell 20, for example.

The refrigerant bypass pipe 550 is a flow passage that connects the refrigerant supply pipe 510 and the refrigerant discharge pipe 515. The switching valve 565 that switches a passage through which the refrigerant flows between the flow passage passing through the radiator 530 and the refrigerant bypass pipe 550 not passing through the radiator 530 is provided at a branch portion where the refrigerant bypass pipe 550 branches from the refrigerant discharge pipe 515. The switching valve 565 is a valve capable of changing the ratio of the flow rate of the refrigerant flowing through the radiator 530 and the flow rate of the refrigerant flowing by bypassing the radiator 530.

The hydrogen filling system 600 includes a hydrogen tank 210, a hydrogen filling pipe 30, and a receptacle 64. The hydrogen tank 210 is provided commonly to the hydrogen filling system 600 and the fuel gas supply system 200 described above. The receptacle 64 is provided on the side surface of a vehicle body 22 of the fuel cell vehicle 10, and has a structure for connecting a hydrogen filling device (not shown) to the fuel cell vehicle 10 when filling the hydrogen tank 210 with hydrogen. The hydrogen filling pipe 30 is a flow passage that connects the hydrogen tank 210 and the receptacle 64. The hydrogen filling device is a device that fills the hydrogen tank 210 with hydrogen, and can be provided in, for example, a hydrogen station. The hydrogen filling device includes a precooler, and cools hydrogen prior to filling with hydrogen to suppress the temperature inside the hydrogen tank from excessively rising due to a phenomenon called adiabatic compression during filling with hydrogen. Therefore, hydrogen supplied from the hydrogen filling device through the receptacle 64 has a low temperature of, for example, about −40° C.

The hydrogen tank 210 includes a valve mechanism 62 disposed in a tank cap. The valve mechanism 62 has an in-valve flow passage 34 formed therein. The in-valve flow passage 34 includes a first flow passage 35, a second flow passage 36, and a third flow passage 37. A first end of the first flow passage 35 is open at the surface of the valve mechanism 62, and is connected to the hydrogen filling pipe 30. The first flow passage 35 is provided with a tank check valve 52 that allows only the hydrogen flow from the hydrogen filling pipe 30 in the hydrogen tank 210. A second end of the first flow passage 35 is connected to a first end of the third flow passage 37. A first end of the second flow passage 36 is open at the surface of the valve mechanism 62, and is connected to the fuel gas supply pipe 220. The second flow passage 36 is provided with a main stop valve 53 that is a solenoid valve that opens and closes the second flow passage 36. A second end of the second flow passage 36 is connected to a first end of the third flow passage 37. A second end of the third flow passage 37 is open inside the hydrogen tank 210. However, the first flow passage 35 and the second flow passage 36 may be separately connected to the space inside the hydrogen tank 210 without providing the third flow passage 37 in which the first flow passage 35 and the second flow passage 36 join together. The hydrogen tank 210 further includes a tank temperature sensor 45 that detects the temperature inside the hydrogen tank 210.

A fourth flow passage 38 is formed inside the receptacle 64. A first end of the fourth flow passage 38 is connected to the hydrogen filling pipe 30. A second end of the fourth flow passage 38 opens at the surface of the vehicle body 22 to form a filling port 26 in which hydrogen supplied from the hydrogen filling device 70 flows. The fourth flow passage 38 is provided with a receptacle check valve 51 that allows only the hydrogen flow from the filling port 26 in the hydrogen filling pipe 30. In the configuration shown in FIG. 1, the flow passage connecting the hydrogen tank and the fuel cell 20 is also referred to as a "hydrogen supply passage". In the present embodiment, the "hydrogen supply passage" includes the third flow passage 37, the second flow passage 36, and the fuel gas supply pipe 220.

The vehicle body 22 is provided with a lid 24 that covers the receptacle 64. The lid 24 is attached to the vehicle body 22 via a hinge so as to be openable and closable, and is opened when the hydrogen tank 210 is filled with hydrogen by the hydrogen filling device described above. The lid 24 is provided with a tab portion 25, and the vehicle body 22 is provided with an engaging portion 27 at a position corresponding to the tab portion 25. In a case where filling with hydrogen is not executed, the tab portion 25 and the engaging portion 27 are engaged with each other to close the lid 24. In the fuel cell vehicle 10 according to the present embodiment, a filling port switch 28 is provided in the vicinity of the driver's seat. The filling port switch 28 is electrically connected to the engaging portion 27 via a relay, and in a case where an operating force is applied to the filling port switch 28 by the user and the filling port switch is turned on, the operating force is transmitted to the engaging portion 27, the engagement state between the engaging portion 27 and the tab portion 25 is released, and the lid 24 is opened. Further, in the vehicle body 22, a lid sensor 46 that detects that the lid 24 is in the closed state is provided in the vicinity of the receptacle 64. The filling port switch 28 that detects the start of filling of the hydrogen tank with hydrogen 210 is also referred to as a "detection unit". In the fuel cell vehicle 10 according to the present embodiment, the start of filling with hydrogen is detected by turning on the filling port switch, and the end of filling with hydrogen is detected by the lid sensor 46, but another configuration may be used. For example, the lid sensor 46 may detect both the start and end of filling with hydrogen.

The controller 900 is configured of a microcomputer, and includes a CPU, a ROM, a RAM, and an input/output port. The controller 900 performs power generation control of the fuel cell system 15, control of purge of the fuel cell 20, control of filling of the hydrogen tank with hydrogen 210, and control of the entire fuel cell vehicle 10. The control of purge of the fuel cell 20 and the control of filling of the hydrogen tank with hydrogen 210 will be described in detail below. The controller 900 acquires output signals from the sensors (including a sensor provided in each unit of the fuel cell system 15, an accelerator operation amount sensor, a brake pedal sensor, a shift position sensor, and a vehicle speed sensor) provided in units of the fuel cell vehicle 10. Then, the controller 900 outputs a drive signal to each unit relating to power generation or traveling in the fuel cell vehicle 10, specifically, the above-described valves or pumps included in the fuel cell system 15. The controller 900 that performs the above-described functions is not needed to be configured as a single controller. For example, the controller 900 may be configured by a plurality of controllers, such as a controller relating to the operation of the fuel cell system 15, a controller relating to the traveling of the fuel cell vehicle 10, or a controller performing control the vehicle accessories regardless of the traveling, and necessary information may be exchanged between the controllers.

Figure 2:
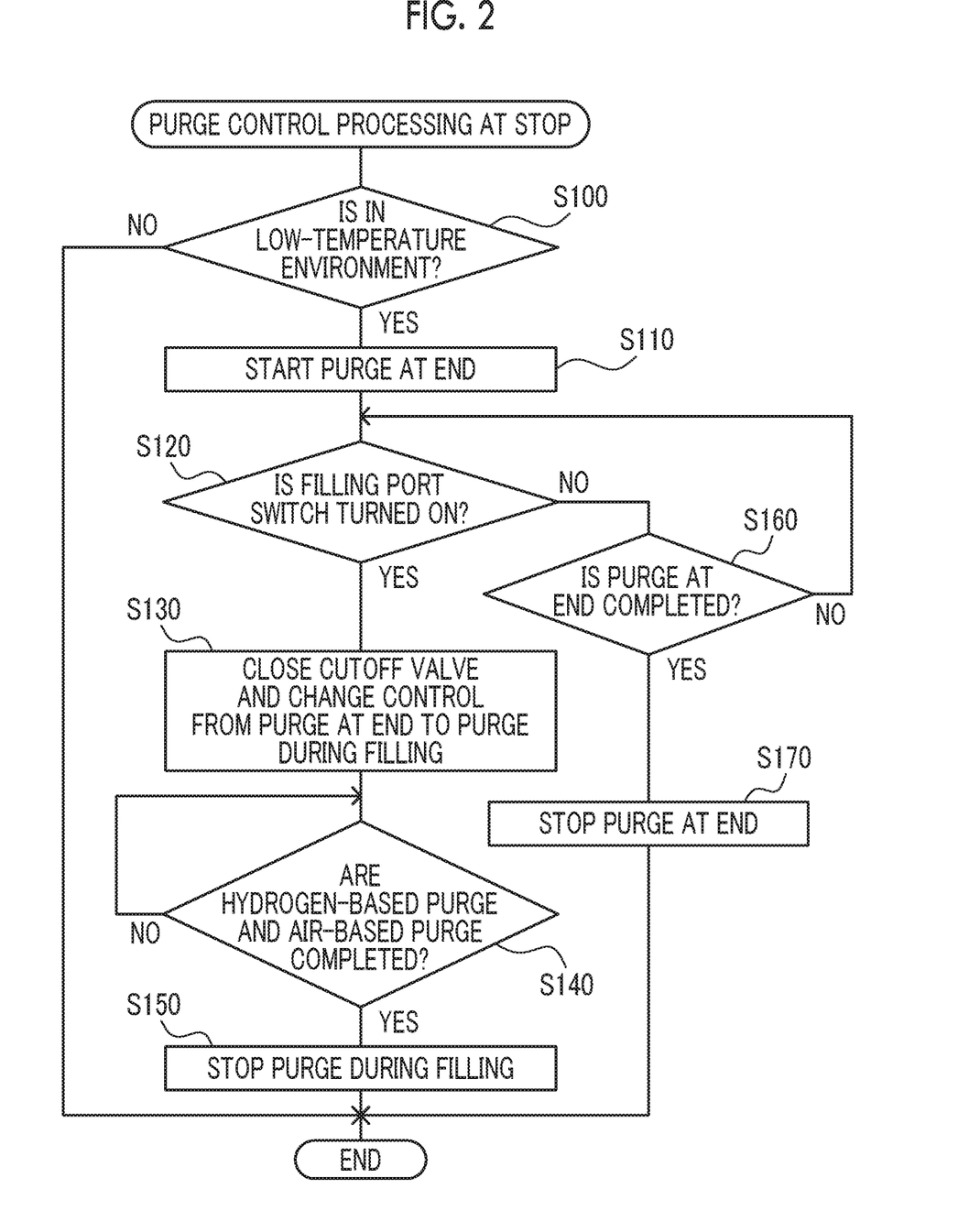
FIG. 2 is a flowchart showing a purge control processing routine at a stop.

(A-2) Purge Processing During Filling:

FIG. 2 is a flowchart showing a purge control processing routine at a stop executed by the controller 900 of the fuel cell system 15 according to the present embodiment. The routine is started when an instruction to stop the system including the fuel cell system 15 equipped in the fuel cell vehicle 10 is input, specifically, when a start switch (not shown) is turned off by the driver. When the routine is executed, the controller 900 functions as a "purge controller".

In a case where the routine is started, the CPU of the controller 900 determines whether the fuel cell vehicle 10 is being used in the low-temperature environment, that is, the current environment temperature at which the fuel cell vehicle 10 is used is the low-temperature environment temperature carrying a risk of freezing of the fuel cell 20 upon the next startup of the fuel cell system (step S100). Specifically, the CPU of the controller 900 acquires a detection signal of an outside air temperature sensor 910 provided in the fuel cell vehicle 10, and in a case where the outside air temperature is below a freezing point, determines that the fuel cell vehicle is in the low-temperature environment. The CPU may determine whether the fuel cell vehicle is in the low-temperature environment based on a criterion different from whether the outside air temperature is below the freezing point, for example, the determination may be made based on a predetermined temperature lower than 0° C. In step S100, the controller 900 functions as a "low-temperature determination unit". In a case where the determination is made that the fuel cell vehicle is not in the low-temperature environment (step S100: NO), the CPU of the controller 900 ends the routine.

In a case where the determination is made that the fuel cell vehicle is in the low-temperature environment (step S100: YES), the CPU of the controller 900 starts purge processing at the end (step S110). That is, in the present embodiment, in a case where the determination is made that the fuel cell vehicle is in the low-temperature environment in step S100, a state is determined that the purge processing is to be executed. The purge processing at the end is executed when the fuel cell system 15 is stopped, is processing of causing the reaction gas to flow in the reaction gas flow passage in the fuel cell 20 and purging the flow passage through which the reaction gas flows, and is executed to suppress dew condensation or freezing of the gas flow passage by suppressing the residence of liquid water in the gas flow passage. Specifically, for the in-cell hydrogen flow passage, the main stop valve 53 and the injector 270 are opened, the hydrogen pump 290 is driven, and the purge valve 440 is opened at a predetermined timing. For the in-cell oxidizing gas flow passage, the air compressor 320 is driven while the sealing valve 360 and the bypass valve 460 are controlled such that air is supplied to the in-cell oxidizing gas flow passage. As a result, the in-cell hydrogen flow passage can be purged by using hydrogen in the hydrogen tank 210, and the in-cell oxidizing gas flow passage can be purged by the air that is the oxidizing gas.

In a case where the purge processing at the end is started in step S110, the CPU of the controller 900 determines whether the filling port switch 28 is turned on (step S120). The filling port switch 28 is a switch operated by the user of the fuel cell vehicle 10 when the filling of the hydrogen tank with hydrogen 210 is started as described above, in a case where the filling port switch 28 is turned on, the lid 24 is opened, the fuel cell supply device is connected to the receptacle 64, and the filling of the hydrogen tank with hydrogen 210 can be started.

In a case where the filling port switch 28 is determined to be turned on (step S120: YES), the CPU of the controller 900 closes the injector 270, and changes the control from the purge processing at the end described above to the purge processing during filling (step S130). In the present embodiment, the injector 270 that is closed in step S130 is also referred to as a "cutoff valve". The purge processing during filling executed in step S130 is processing that is executed during filling of the hydrogen tank with hydrogen 210 and purges the in-cell hydrogen flow passage without using hydrogen in the hydrogen tank 210. Specifically, as described above, the injector 270 is closed to suppress the hydrogen flow from the hydrogen tank 210 in the fuel cell 20, the hydrogen pump 290 is driven at a predetermined output, and the purge valve 440 is opened at a predetermined timing. As a result, the in-cell hydrogen flow passage is purged by causing hydrogen remaining on the downstream side of the injector 270 in the hydrogen flow in the hydrogen supply passage to flow in the in-cell hydrogen flow passage to circulate and discharging the anode off-gas containing liquid water or water vapor discharged from the in-cell hydrogen flow passage from the purge valve 440. In the present embodiment, in the purge processing during filling, the purge of the in-cell oxidizing gas flow passage is executed similarly to the purge processing at the end.

In a case where the purge processing during filling is started in step S130, the CPU of the controller 900 determines whether hydrogen-based purge relating to the in-cell hydrogen flow passage and air-based purge relating to the in-cell oxidizing gas flow passage are completed (step S140). The CPU of the controller 900 repeatedly executes the determination of step S140 until the hydrogen-based purge and the air-based purge are completed.

In the purge processing during filling, when hydrogen is caused to flow in the in-cell hydrogen flow passage and air is caused to flow in the in-cell oxidizing gas flow passage, for example, the fuel cell 20 may be caused to generate a small amount of power to the extent that the voltage of the fuel cell 20 (cathode electrode potential) can be suppressed from being excessively high. The power generated by such power generation can be consumed by, for example, the hydrogen pump 290 or the air compressor 320 driven by the purge processing during filling. Since the amount of generated water generated by such small amount power generation is small according to the amount of power generation, the amount of generated water can be suppressed to the amount that does not impair the effect of the purge processing during filling. Therefore, even in a case where the fuel cell 20 is caused to generate power when the purge processing during filling is executed, the in-cell hydrogen flow passage or the in-cell oxidizing gas flow passage can be purged and the amount of water in the flow passage can be reduced. The power needed for executing the purge processing during filling, for example, the power needed for driving the hydrogen pump 290 or the air compressor 320 is supplied from the battery (not shown) equipped in the fuel cell vehicle 10.

In step S140, when the determination of the completion of the hydrogen-based purge is made, for example, the operation of opening the purge valve 440 at a predetermined timing is repeatedly performed, and when the operation of opening the valve reaches a predetermined number of times, the hydrogen-based purge is determined to be completed. When the determination of the completion of the air-based purge is made, for example, the air-based purge is determined to be completed when the drive time of the air compressor 320 after the start of the air-based purge exceeds a predetermined reference time. Alternatively, the resistance component of the impedance of the fuel cell 20 is measured using an alternating current impedance method, and in a case where the obtained impedance value is larger than a predetermined reference value, the purge processing during filling may be determined to be completed based on an amount of water of the electrolyte film lower than the reference condition. Specifically, when the fuel cell 20 is caused to generate a small amount of power as described above, the impedance of the fuel cell 20 need only be detected by the alternating current impedance method by superimposing an alternating current signal (for example, a signal with a relatively high frequency of 200 Hz to 1 kHz) on the current drawn from the fuel cell 20. Alternatively, the film resistance of the electrolyte film is measured by a method other than the alternating current impedance method, for example, by a current interruption method, and when the measured film resistance exceeds a predetermined reference value, the purge processing during filling may be determined to be completed. In the determination of step S140, the criterion for determining the completion of the purge processing during filling may be changed such that the purge processing during filling is executed longer as the outside air temperature or the temperature of the fuel cell 20 is lower.

In a case where the purge processing during filling is determined to be completed (step S140: YES), the CPU of the controller 900 stops the purge processing during filling (step S150), and ends the routine. When the purge processing during filling is stopped, the CPU of the controller 900 stops driving of the hydrogen pump 290 and the air compressor 320.

In step S120, in a case where the filling port switch 28 is determined not to be turned on (step S120: NO), the CPU of the controller 900 determines whether the purge processing at the end is completed (step S160). The determination on whether the purge processing at the end is completed can be made similar to the determination on whether the purge processing during filling is completed in step S140. That is, the determination need only be made on whether the number of time of operation of opening the purge valve 440, the drive time of the air compressor 320 after the start of the air-based purge, or the impedance value of the fuel cell 20 exceeds a predetermined reference value. At this time, the criterion for determining whether the purge processing at the end is completed and the criterion for determining whether the purge processing during filling is completed may be the same or different.

In a case where the purge processing at the end is not completed (step S160: NO), the processing returns to step S120, and the CPU of the controller 900 determines whether the filling port switch 28 is turned on. When the filling port switch 28 is turned on, the CPU of the controller 900 executes processing of step S130 and subsequent steps.

In a case where the purge at the end is completed without turning on the filling port switch 28 (step S160: YES), the CPU of the controller 900 stops the purge processing at the end (step S170), ends the routine. When the purge processing at the end is stopped, the CPU of the controller 900 stops driving of the hydrogen pump 290 and the air compressor 320, and closes the main stop valve 53.

In the fuel cell system 15 according to the present embodiment configured as described above, when the hydrogen tank 210 is filled with hydrogen in the low-temperature environment, by executing the purge processing in parallel to the filling with hydrogen, freezing of the fuel cell 20 during filling with hydrogen is suppressed, and freezing of the fuel cell 20 or the flow passage of the fuel gas due to the low-temperature hydrogen used for filling flowing in the fuel cell 20 can be suppressed. In the present embodiment, during filling of the hydrogen tank with hydrogen 210, since the injector 270 that is the cutoff valve is closed, and the purge processing is executed by using hydrogen remaining on the downstream side of the injector 270 in the hydrogen flow in the flow passage of the fuel gas, the low-temperature hydrogen used for filling with hydrogen is suppressed from flowing in the fuel cell 20. As described above, since the filling with hydrogen can be executed in parallel to the purge processing, for example, when filling with hydrogen is executed at the hydrogen station in the low-temperature environment, the user is not needed to wait prior to the start of the operation of the filling with hydrogen until the purge processing for suppressing freezing of the fuel cell 20 is completed. In the first embodiment, each time the purge valve 440 is opened, the pressure in the circulation flow passage decreases, but the hydrogen-based purge can be continued while the pressure in the circulation flow passage is sufficiently higher than the atmospheric pressure and liquid water or water vapor in the circulation flow passage can be discharged to the outside by opening the purge valve 440.

B. Second Embodiment

In the first embodiment, the injector 270 as the cutoff valve is closed when the purge processing during filling is executed, but a different configuration may be adopted. Hereinafter, as a second embodiment, a configuration will be described in which the main stop valve 53 as the cutoff valve is closed when the purge processing during filling. The fuel cell system 15 and the fuel cell vehicle 10 according to the second embodiment have the same configuration as the configuration in the first embodiment, and the components common to the first embodiment are designated by the same reference numerals. The controller 900 according to the second embodiment executes the purge control processing routine at a stop shown in FIG. 2 similar to the first embodiment. Hereinafter, the difference of the second embodiment from the first embodiment will be described.

In the second embodiment, in the hydrogen-based purge of the purge processing during filling started in step S130, the CPU of the controller 900 closes the main stop valve 53 as the cutoff valve to suppress the hydrogen flow from the hydrogen tank 210 in the fuel cell 20, drives the hydrogen pump 290 with a predetermined output, performs opening control on the purge valve 440 at a predetermined timing, and performs opening control of the injector 270. In the opening control of the injector 270, a pressure sensor that detects a pressure of the fuel gas supplied to the fuel cell 20 need only be provided downstream of the injector 270 in the flow passage of the fuel gas connected to the fuel cell 20, and the injector 270 need only be opened such that the detection value of the pressure sensor does not fall below a predetermined pressure. In the hydrogen supply passage, hydrogen having a higher pressure than the downstream of the injector 270 remains between the closed main stop valve 53 and the injector 270. Therefore, for example, in a case where the injector 270 is opened after the pressure in the circulation flow passage is reduced by opening the purge valve 440 and discharging a part of the fuel gas in the circulation flow passage from the purge valve 440, the pressure in the circulation flow passage that has decreased can be increased. In the second embodiment, in the hydrogen supply passage, while the pressure between the main stop valve 53 and the injector 270 is higher than the pressure downstream of the injector 270, the circulation flow passage can be replenished with hydrogen by opening the injector 270. The injector 270 according to the second embodiment is a valve that controls an amount of hydrogen supplied to the fuel cell 20 provided between the main stop valve 53 that is the cutoff valve and the fuel cell 20, and also referred to as a "control valve".

According to such a configuration, in addition to obtaining the same effect as the effect of the first embodiment, the effect can be obtained in which an amount of hydrogen that remains on the downstream side of the cutoff valve in the hydrogen flow and can be used for the purge processing during filling can be increased. In the second embodiment, while the purge processing during filling is executed, by supplying hydrogen remaining between the main stop valve 53 and the injector 270 to the circulation flow passage by using the injector 270 when the purge valve 440 is repeatedly opened, the high pressure state in the circulation flow passage can be maintained for a longer time. Therefore, the efficiency of the purge processing of discharging liquid water or water vapor from the purge valve 440 can be improved. As a result, an amount of water in the fuel cell 20 can be further sufficiently reduced by completing the purge processing during filling faster or by executing the purge processing during filling for a longer time.

C. Third Embodiment

In the first embodiment and the second embodiment, the fuel cell system 15 includes the circulation flow passage that guides the anode off-gas to the fuel cell 20 as the flow passage of the fuel gas, but may have different configuration. Hereinafter, as a third embodiment, a configuration will be described in which the flow passage of the fuel gas does not include the circulation flow passage, and the anode off-gas is not supplied to the fuel cell 20 and discharged to the outside of the fuel cell system 15.

Figure 3:
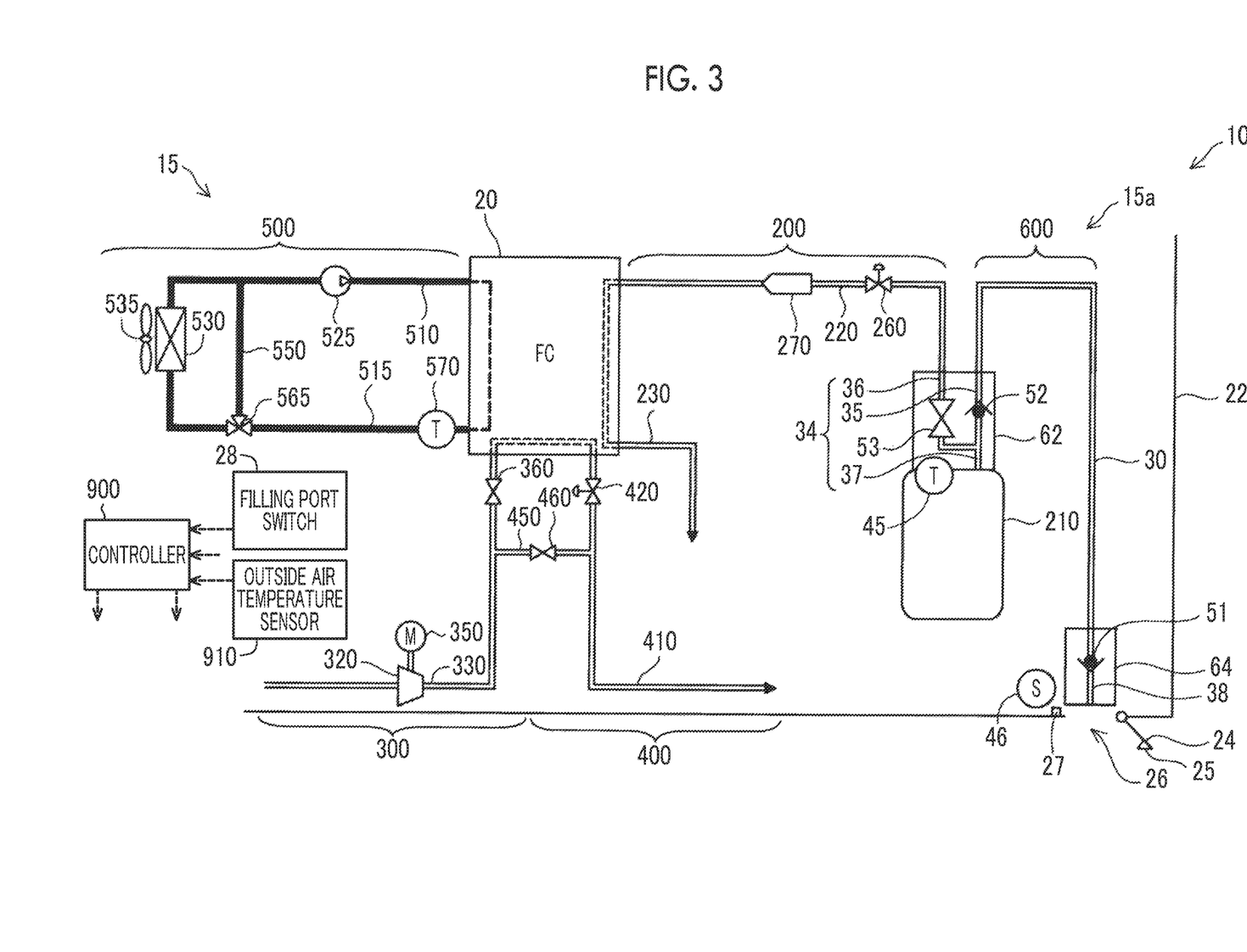
FIG. 3 is an explanatory diagram schematically showing an outline configuration of a fuel cell system.

FIG. 3 is an explanatory diagram schematically showing an outline configuration of a fuel cell system 15a as the third embodiment. In the third embodiment, the components common to the first embodiment are designated by the same reference numerals. The controller 900 of the fuel cell system 15a according to the third embodiment executes the purge control processing routine at a stop shown in FIG. 2 similar to the first embodiment. Hereinafter, the difference of the third embodiment from the first embodiment will be described.

In the fuel cell system 15a according to the third embodiment, as described above, the flow passage of the fuel gas does not include the circulation flow passage, and the anode off-gas is not supplied to the fuel cell 20 and discharged to the outside of the fuel cell system 15. At this time, the anode off-gas discharged from the fuel gas exhaust pipe 230 may be used, for example, in another device equipped in the fuel cell vehicle 10, or may be diluted with the cathode off-gas discharged through the exhaust gas pipe 410 from the fuel cell 20 so as to be discharged to the outside of the fuel cell system 15a. The fuel cell system 15a according to the third embodiment performs controls on the cutoff valve and the control valve in the hydrogen-based purge of the purge control during filling executed in step S130 of FIG. 2 similar to the control in the second embodiment. That is, the fuel cell system 15a closes the main stop valve 53 that is the cutoff valve to suppress the hydrogen flow from the hydrogen tank 210 in the fuel cell 20, and performs opening control on the injector 270 that is the control valve. That is, the fuel cell system 15a drives the injector 270, supplies hydrogen remaining between the injector 270 and the main stop valve 53 in the hydrogen supply passage in the in-cell hydrogen flow passage, and executes the hydrogen-based purge.

Even with such a configuration, similar to the first embodiment, the purge processing can be executed in parallel to the filling of the hydrogen tank with hydrogen 210 in the low-temperature environment, and the effect of suppressing freezing of the fuel cell 20 during filling with hydrogen. At this time, similar to the second embodiment, the hydrogen-based purge can be executed by using hydrogen that remains between the main stop valve 53 and the injector 270 and has a relatively high pressure.

D. Fourth Embodiment

Figure 4:
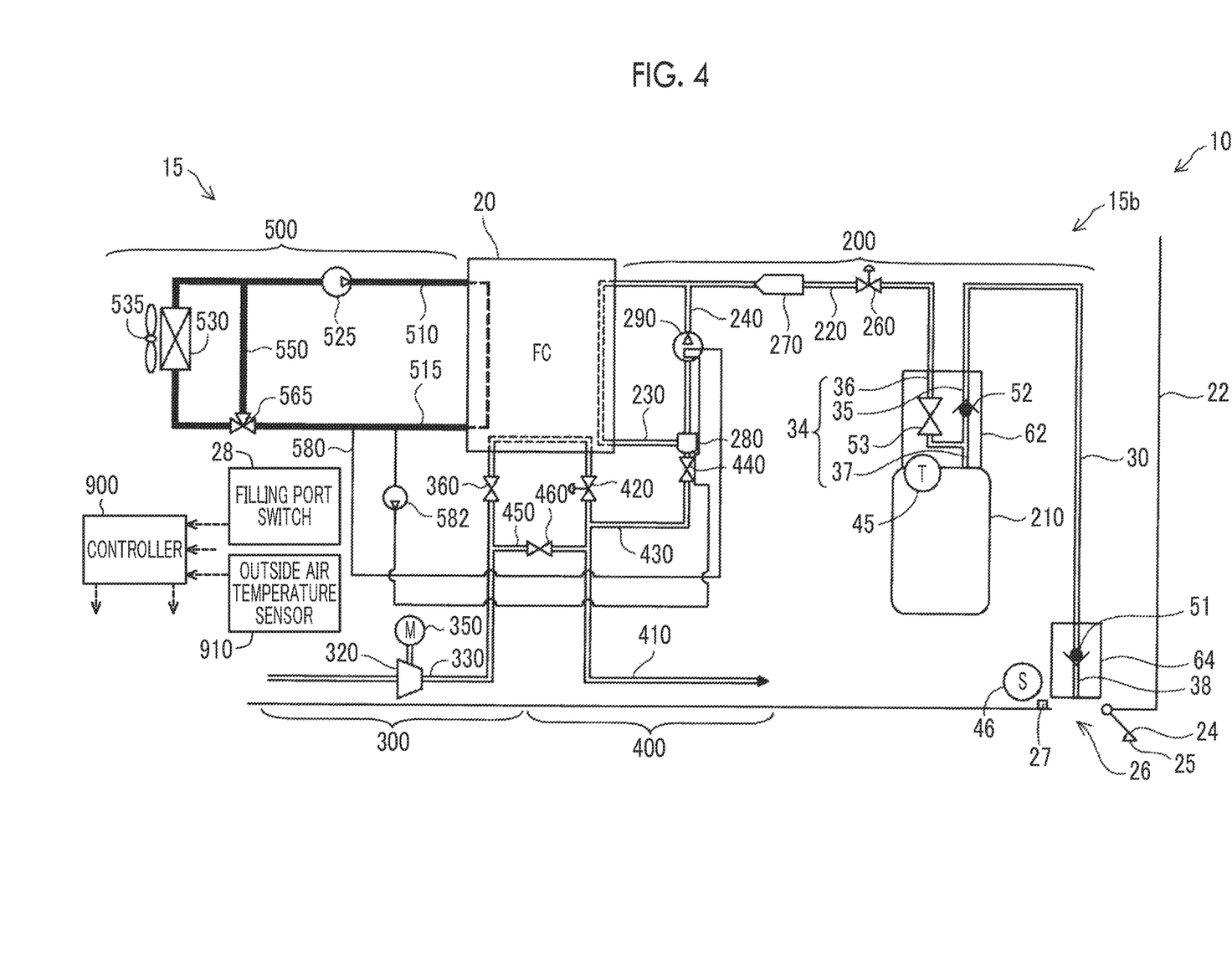
FIG. 4 is an explanatory diagram schematically showing an outline configuration of a fuel cell system.

FIG. 4 is an explanatory diagram schematically showing an outline configuration of a fuel cell system 15b as a fourth embodiment. In the fourth embodiment, the components common to the first embodiment are designated by the same reference numerals. The controller 900 of the fuel cell system 15b according to the fourth embodiment executes the purge control processing routine at a stop shown in FIG. 2 similar to the first embodiment or the second embodiment. When the system is stopped and the hydrogen tank 210 is filled with hydrogen, the fuel cell system 15b according to the fourth embodiment executes the purge processing during filling similar to the first embodiment, and executes temperature retention processing during filling of raising or retaining the temperatures of the hydrogen pump 290 and the purge valve 440 provided in the hydrogen supply passage by using the refrigerant in the fuel cell 20. Hereinafter, the difference of the fourth embodiment from the first embodiment will be described.

The fuel cell system 15b includes a branch flow passage 580 that is a flow passage branching from the refrigerant flow passage described above. Both ends of the branch flow passage 580 are connected to the refrigerant discharge pipe 515. The branch flow passage 580 according to the fourth embodiment is a flow passage that guides the refrigerant such that the heat is exchangeable between the refrigerant, and the hydrogen pump 290 and the purge valve 440, respectively, and is drawn close to the hydrogen pump 290 and the purge valve 440. The branch flow passage 580 is provided with a second refrigerant pump 582 that allows the refrigerant in the fuel cell 20 to flow in the branch flow passage. Therefore, even when the first refrigerant pump 525 is stopped, the second refrigerant pump 582 is driven to allow the refrigerant in the fuel cell 20 to flow in the branch flow passage 580, and the heat is exchangeable between the refrigerant, and the hydrogen pump 290 and the purge valve 440.

Figure 5:
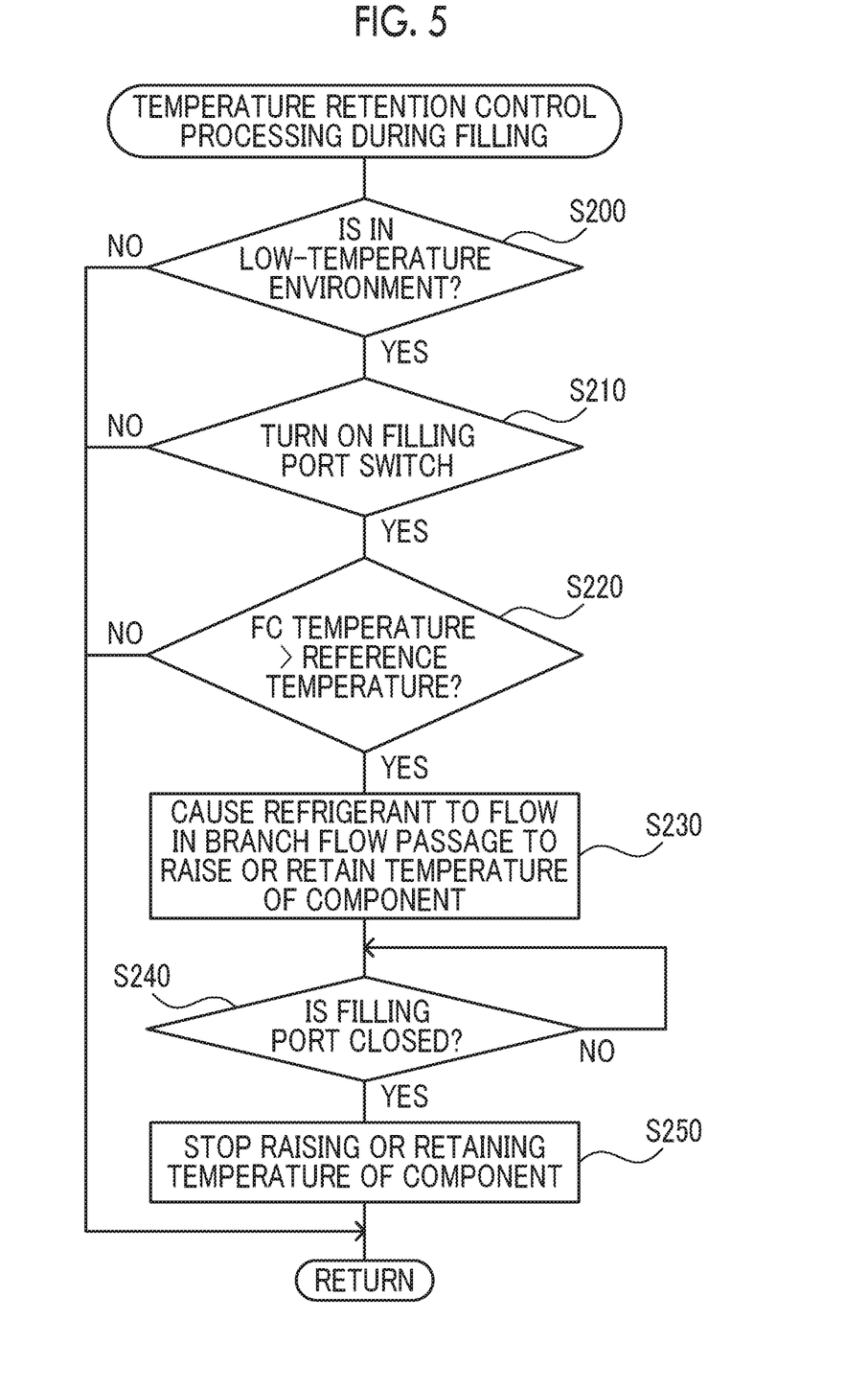
FIG. 5 is a flowchart showing a temperature retention control processing routine during filling.

FIG. 5 is a flowchart showing a temperature retention control processing routine during filling executed by the controller 900 of the fuel cell system 15b according to the fourth embodiment. The routine is started with the purge control processing routine at a stop shown in FIG. 2 and repeatedly executed when an instruction to stop the system including the fuel cell system 15b equipped in the fuel cell vehicle 10 is input, specifically, when a start switch (not shown) is turned off by the driver. When the routine is executed, the controller 900 functions as a "temperature retention controller".

When the routine is started, the CPU of the controller 900 determines whether the current usage environment of the fuel cell vehicle 10 is in the low-temperature environment carrying a risk of freezing of the fuel cell 20 upon the next startup of the fuel cell system (step S200). Step S200 is the same step as step S100. In a case where the determination is made that the fuel cell vehicle is not in the low-temperature environment (step S200: NO), the CPU of the controller 900 ends the routine.

In a case where the current usage environment is determined to be in the low-temperature environment (step S200: YES), the CPU of the controller 900 determines whether the filling port switch 28 is turned on (step S210). Step S210 is the same step as step S120, and the filling port switch 28 is turned on, and then filling of the hydrogen tank with hydrogen 210 is to be possible. In a case where the filling port switch 28 is determined not to be turned on (step S210: NO), the CPU of the controller 900 ends the routine.

In a case where the filling port switch 28 is determined to be turned on (step S210: YES), the CPU of the controller 900 acquires the temperature of the fuel cell 20 from the FC temperature sensor 570 and compares the acquired temperature with a predetermined reference temperature (step S220). The reference temperature used in step S220 is a temperature used for determining whether freezing of the hydrogen pump 290 and the purge valve 440 can be suppressed by exchanging the heat between the refrigerant in the fuel cell 20 and the hydrogen pump 290 and the purge valve 440. Such a reference temperature is predetermined and stored in a memory of the controller 900. The reference temperature need only be appropriately set in consideration of the heat capacity of the fuel cell 20, the heat radiation in the pipe of the refrigerant, or the efficiency of heat exchange between the refrigerant, and the hydrogen pump 290 and the purge valve 440, and may be changed depending on the outside air temperature. The reference temperature can be set appropriately in the range of 10° C. to 30° C., for example. When the temperature of the fuel cell 20 is determined to be equal to or lower than the reference temperature (step S220: NO), the CPU of the controller 900 ends the routine.

When the temperature of the fuel cell 20 is determined to exceed the reference value (step S220: YES), the CPU of the controller 900 allows the refrigerant in the fuel cell 20 to flow in the branch flow passage 580, and executes the operation of raising or retaining the temperatures of the hydrogen pump 290 and the purge valve 440 (step S230). Specifically, the CPU of the controller 900 drives the second refrigerant pump 582. By driving the second refrigerant pump 582 and allowing the refrigerant in the fuel cell 20 to flow in the branch flow passage 580, the heat is exchanged between the refrigerant, and the hydrogen pump 290 and the purge valve 440, and the temperatures of the hydrogen pump 290 and the purge valve 440 are raised or retained. Since the flow rate of the refrigerant at this time need only be to such an extent that the heat radiation of the refrigerant is suppressed and the heat of the refrigerant can be transferred to the hydrogen pump 290 and the purge valve 440, the flow rate is smaller than the flow rate when the first refrigerant pump 525 is driven when the fuel cell 20 generates power. In step S230, the CPU of the controller 900 switches the switching valve 565 to guide the refrigerant such that the refrigerant bypasses the radiator 530 and passes through the refrigerant bypass pipe 550. By causing the refrigerant to bypass the radiator 530, the temperature drop of the refrigerant can be suppressed.

After step S230 is executed, the CPU of the controller 900 determines whether the filling port 26 is closed, that is, whether the lid sensor 46 detects that the lid 24 is in the closed state (step S240). When the filling port 26 is determined not to be closed (step S240: NO), the CPU of the controller 900 repeats the determination of step S240 until the determination is made that the filling port 26 is closed. In the meanwhile, the second refrigerant pump 582 is driven, and the operation of raising or retaining the temperatures of the hydrogen pump 290 and the purge valve 440 is continued.

When the filling port 26 is determined to be closed (step S240: YES), the CPU of the controller 900 stops the operation of raising or retaining the temperatures of the hydrogen pump 290 and the purge valve 440 (step S250), and ends the routine. Specifically, in step S250, the second refrigerant pump 582 is stopped.

According to such a configuration, by executing the temperature retention processing during filling, the effect can be obtained in which freezing of the hydrogen pump 290 and the purge valve 440 is suppressed during filling with hydrogen, in addition to obtaining the same effect as the effect of the first embodiment. The hydrogen pump 290 and the purge valve 440 are generally provided apart from the fuel cell 20 that generates heat during power generation, and are likely to have a dropped temperature in the low-temperature environment and likely to freeze. When liquid water in the hydrogen pump 290 freezes, the problem may occur in the hydrogen circulation operation by the hydrogen pump 290. When the purge valve 440 freezes, the problem may occur in the operation of discharging the fuel gas containing liquid water and water vapor from the circulation flow passage. Therefore, when the hydrogen pump 290 or the purge valve 440 freezes, the problem may occur in the operation of hydrogen-based purge. According to the present embodiment, the occurrence of the above problems can be suppressed by raising or retaining the temperatures of the hydrogen pump 290 and the purge valve 440.

In the temperature retention processing during filling, as long as the appropriate flow rate of refrigerant smaller than the flow rate of the refrigerant at the power generation of the fuel cell 20 can be realized, another pump is not needed to be provided as the second refrigerant pump 582 separately from the first refrigerant pump 525, and single refrigerant pump may be used. However, by using the second refrigerant pump 582 smaller than the first refrigerant pump 525 to easily realize a smaller flow rate of the refrigerant than the flow rate at power generation, the power consumption of the refrigerant pump when the temperature retention processing during filling is executed can be suppressed.

In the fourth embodiment, when the temperature retention processing during filling is executed, the filling port switch 28 is confirmed to be turned on in step S210, but such an operation may not be performed. However, when the filling port switch 28 is confirmed to be turned on, driving the second refrigerant pump 582 at the time other than filling with hydrogen is suppressed, and the power consumption by the second refrigerant pump 582 can be suppressed, so the confirmation is desirable.

In the fourth embodiment, the temperatures of both the hydrogen pump 290 and the purge valve 440 are raised or retained in the temperature retention processing during filling, but only the temperatures of one of the components may be raised or retained. Further, in addition to these components, or instead of these components, the other components and the refrigerant may be heat-exchanged to raise or retain the temperature. The target component of the temperature retention processing during filling need only be a component provided in the reaction gas flow passage through which hydrogen to be supplied to the fuel cell 20 or the oxidizing gas (for example, various valves), and freezing of these components during the filling with hydrogen in the low-temperature environment need only be able to be suppressed by executing the temperature retention processing during filling. As a result, the occurrence of the problems in the operation of the purge processing during filling due to freezing of the components provided in the reaction gas flow passage can be suppressed.

E. Other Embodiments (E1) In the first embodiment, the cutoff valve that closes when the purge processing during filling is executed is the injector 270, and in the second and third embodiments, the above-described cutoff valve is the main stop valve 53, but another configuration may be adopted. The cutoff valve may be another kind of valve as long as the cutoff valve can cut off the circulation of hydrogen in the hydrogen supply passage connecting the hydrogen tank 210 and the fuel cell 20. Further, the cutoff valve may not completely cut off the circulation of hydrogen in the hydrogen supply passage. The circulation of a small amount of hydrogen may be allowed as long as the hydrogen flow can be suppressed such that freezing of the fuel cell 20 due to flowing of low-temperature hydrogen filled in the hydrogen tank 210 can be suppressed.

(E2) In the above embodiments, it is assumed that in the fuel cell vehicle 10 that has moved to the hydrogen station provided with the hydrogen filling device, the hydrogen filling operation is immediately performed after the system is stopped, but another configuration may be adopted. For example, the present disclosure can be adopted in a case where a mobile hydrogen station configured by the vehicle equipped with the hydrogen filling device is moved to the parking area of the fuel cell vehicle 10 in which the system is stopped, and the filling with hydrogen is executed by the mobile hydrogen station.

The fuel cell vehicle 10 may execute the purge processing by wake-up processing of temporarily starting the fuel cell system 15 when the fuel cell system 15 is being stopped, in addition to executing of the purge processing at the end when the system is stopped in the low-temperature environment, as described above. Specifically, the controller 900 may set a wake-up timer while the fuel cell system 15 is stopped, determine the necessity of the purge processing based on the outside air temperature at a predetermined reference time interval as the wake-up processing, and execute the purge processing similar to the purge at the end when the purge processing is determined to be needed, to suppress freezing upon the next startup. In a case where filling with hydrogen is executed by the mobile hydrogen station during the execution of the purge processing associated with the wake-up processing, the same purge processing during filling can be executed as in the above embodiments. The specific operation will be described below. The fuel cell system 15 and the fuel cell vehicle 10 according to the modification example have the same configuration as the configuration in the first embodiment, and the components common to the first embodiment are designated by the same reference numerals.

Figure 6:
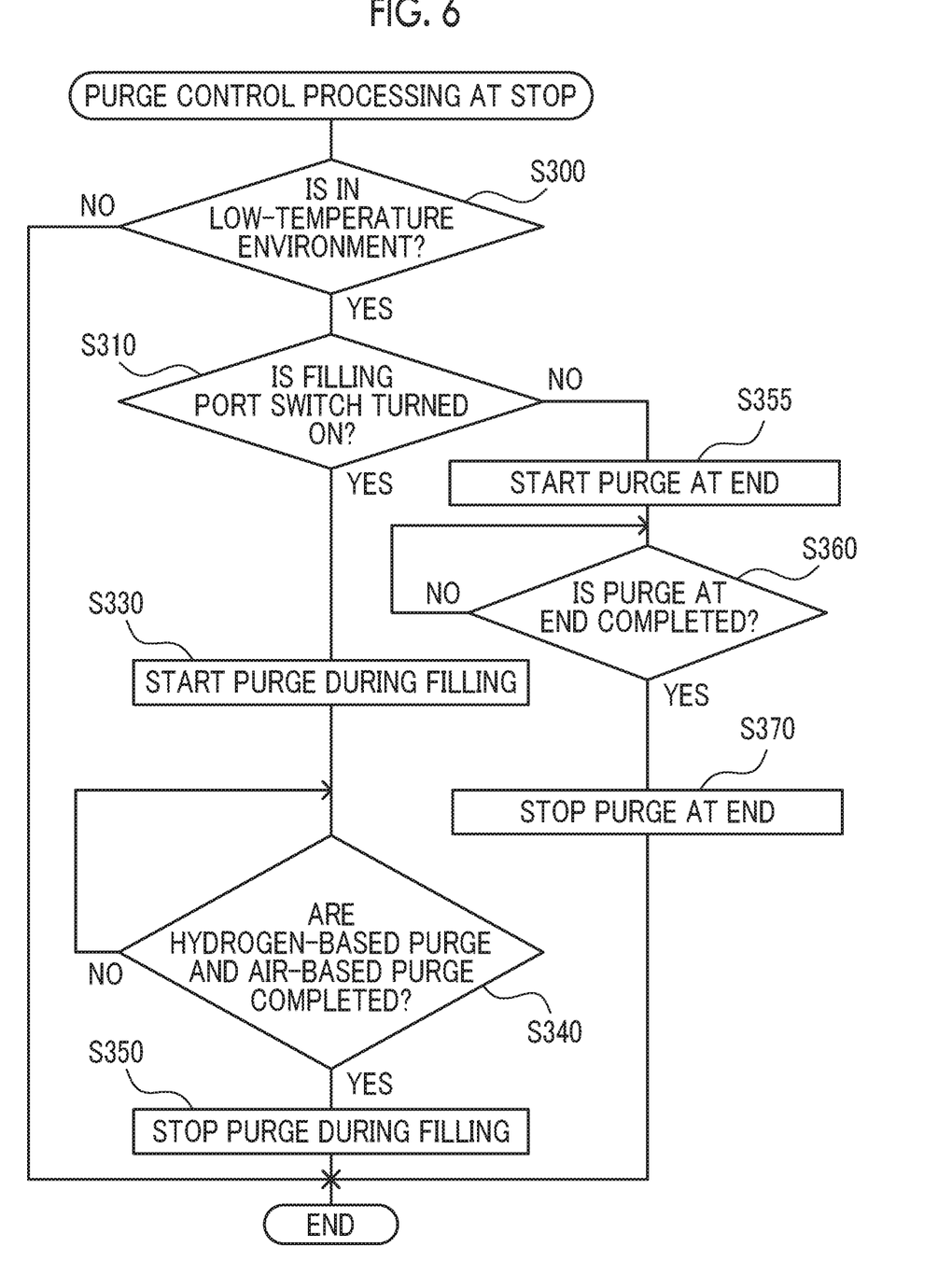
FIG. 6 is a flowchart showing a purge control processing routine at a stop.

FIG. 6 is a flowchart showing a purge control processing routine at a stop executed by the controller 900 of the fuel cell system 15 according to a modification example. The routine is started when the above wake-up processing is executed. When the routine is started, the CPU of the controller 900 determines whether the current usage environment of the fuel cell vehicle 10 is in the low-temperature environment carrying a risk of freezing of the fuel cell 20 upon the next startup of the fuel cell system (step S300). Step S300 is the same step as step S100. Then, the CPU of the controller 900 determines whether the filling port switch 28 is turned on (step S310). Step S310 is the same step as step S120. In the modification example, when the wake-up processing is executed, since the filling port switch 28 may have already been turned on to start the filling with hydrogen, the determination is made as to whether the filling port switch 28 is turned on, prior to the start of the purge processing such as the purge processing at the end. In a case where the filling port switch 28 is turned on (step S310: YES), the CPU of the controller 900 starts the purge processing during filling (step S330), executes step S340 and step S350 that is the same processing as step S140 and step S150, and ends the routine.

In a case where the filling port switch is determined not to be turned on (step S310: NO), the CPU of the controller 900 starts the purge processing at the end (step S355), and in a case where the purge processing at the end is determined to be completed (step S360), stops the purge processing at the end (step S370), and ends the routine. Step S360 and step S370 are the same step as steps S160 and S170. In a case where the filling port switch 28 is turned on after the purge processing at the end is started in step S355, a control need only be changed from the purge processing at the end to the purge processing during filling by interrupt processing. Even with such a configuration, the effect of suppressing freezing of the fuel cell 20 due to the low-temperature hydrogen to be filled can be obtained without performing the filling with hydrogen and the purge processing in parallel.

(E3) In the above embodiments, when the fuel cell system is stopped, the determination is made as to whether the current usage environment is in the low-temperature environment prior to executing of the purge processing including the purge processing during filling (step S100), and in a case of in the low-temperature environment, a state is determined to be in the state in which the purge processing is to be executed the purge processing is executed, but another configuration may be adopted. For example, when the fuel cell system is stopped, the purge processing may be executed without performing the determination in step S100. According to such a configuration, when the purge processing is executed in a case where the current usage environment is not in the low-temperature environment, upon the next startup, the fuel cell 20 can be started with the suppressed influence of liquid water remaining in the fuel cell 20, and when the starting processing is executed in the low-temperature environment, the same effects as the effect of the embodiments can be obtained.

(E4) In the above embodiments, the purge processing during filling includes the hydrogen-based purge and the air-based purge, and the hydrogen-based purge and the air-based purge are executed simultaneously or in parallel, but another configuration may be adopted. For example, only the hydrogen-based purge may be executed as the purge during filling in a case where the purge at the end is started in step S110, the filling port switch 28 is determined to be turned on in step S120, and then the air-based purge is determined to be completed when a control is changed from the purge at the end to the purge during filling in step S130.

(E5) In the above embodiments, the fuel cell system according to the present disclosure is equipped in the fuel cell vehicle, but the fuel cell system can be applied to various kinds of moving objects such as a bus, a truck, a dual-mode vehicle, or a train, in addition to a passenger car.

The present disclosure is not limited to the above-described embodiments, and can be realized with various configurations without departing from the spirit of the present disclosure. For example, the technical features of the embodiments corresponding to the technical features in each mode described in the section of the SUMMARY can be appropriately replaced or combined to solve some or all of the above objects, or to achieve some of or all the above effects. When the technical features are not described as essential in the present specification, the features can be deleted as appropriate.

What is claimed is:
1. A fuel cell system comprising:
a fuel cell formed comprising an in-cell hydrogen flow passage through which hydrogen flows;
a hydrogen tank configured to store hydrogen;
a hydrogen supply passage connecting the hydrogen tank and the fuel cell;
a cutoff valve configured to cut off flow of hydrogen in the hydrogen supply passage;
a detection unit configured to detect a start of filling of the hydrogen tank with hydrogen;
a circulation flow passage through which hydrogen circulates, the circulation flow passage being located outside of the fuel cell, and the circulation flow passage including a part of the hydrogen supply passage;
a circulation device provided in the circulation flow passage and configured to circulate hydrogen through the circulation flow passage;
a discharge valve configured to discharge hydrogen from the circulation flow passage;
a refrigerant flow passage through which a refrigerant cooling the fuel cell flows;
a branch flow passage branching from the refrigerant flow passage and guiding the refrigerant such that heat is exchangeable between the refrigerant and a component provided in a reaction gas flow passage through which hydrogen or oxidizing gas to be supplied to the fuel cell flows;
a temperature sensor configured to detect a temperature of the fuel cell;

a refrigerant pump configured to cause the refrigerant in the fuel cell to flow into the branch flow passage; and a controller, wherein the controller is configured to, in a case where the fuel cell system is stopped and in a state in which processes of purging the in-cell hydrogen flow passage are to be executed,
  (i) execute a first processing of purging by opening the cutoff valve and operating the circulation device to cause hydrogen to flow from the hydrogen tank to the in-cell hydrogen flow passage; and
  (ii) execute a second processing of purging, after the first processing of purging and when the detection unit detects the start of filling of the hydrogen tank with hydrogen, by closing the cutoff valve and operating the circulation device to cause hydrogen remaining on a downstream side of the cutoff valve in the hydrogen supply passage to flow to the in-cell hydrogen flow passage,
  wherein the controller is configured to drive the refrigerant pump in a case where the fuel cell system is stopped and the temperature of the fuel cell detected by the temperature sensor exceeds a predetermined reference temperature,
  wherein the branch flow passage is located outside of the fuel cell, and
  wherein the branch flow passage is located such that heat is exchangeable between the refrigerant in the branch flow passage and the circulation flow passage or between the refrigerant in the branch flow passage and the discharge valve.

2. The fuel cell system according to claim 1, wherein the second processing of purging executed by the controller includes an operation of opening the discharge valve.

3. The fuel cell system according to claim 1, further comprising a control valve provided between the cutoff valve and the fuel cell and configured to control an amount of hydrogen supplied to the fuel cell,
  wherein the second processing of purging executed by the controller includes an operation of driving the control valve to supply hydrogen remaining between the control valve and the cutoff valve in the hydrogen supply passage to the in-cell hydrogen flow passage.

4. The fuel cell system according to claim 1, wherein the controller is configured to determine whether an environment temperature of the fuel cell system is a low-temperature environment temperature carrying a risk of freezing of the fuel cell upon a next startup of the fuel cell system,
  wherein the controller is configured to determine that the state in which the processes of purging the in-cell hydrogen flow passage are to be executed is in effect in a case where the controller determines that the environment temperature is the low-temperature environment temperature.

5. The fuel cell system according to claim 1, further comprising an oxidizing gas supply unit configured to supply oxidizing gas to an in-cell oxidizing gas flow passage through which oxidizing gas containing oxygen flows in the fuel cell,
  wherein the second processing of purging executed by the controller includes an operation of driving the oxidizing gas supply unit and causing oxidizing gas to flow to the in-cell oxidizing gas flow passage to purge the in-cell oxidizing gas flow passage.

6. A moving object equipped with the fuel cell system according to claim 1.

7. The fuel cell system according to claim 1,
  wherein when an operation of opening the discharge valve reaches a predetermined number of times, the second processing of purging is determined to be completed.

* * * * *